(12) United States Patent
Kalis et al.

(10) Patent No.: US 7,797,300 B2
(45) Date of Patent: Sep. 14, 2010

(54) SYSTEMS AND METHODS FOR CONDUCTING SEARCHES OF MULTIPLE MUSIC LIBRARIES

(75) Inventors: Jeffrey J. Kalis, Sparta, MI (US); Jeff Martin, Chesterfield, MO (US); Sterling Heibeck, Grand Rapids, MI (US); Steve Cummings, Howell, MI (US)

(73) Assignee: Rowe International, Inc., Grand Rapids, MI (US)

( * ) Notice: Subject to any disclaimer, the term of this patent is extended or adjusted under 35 U.S.C. 154(b) by 366 days.

(21) Appl. No.: 11/852,787

(22) Filed: Sep. 10, 2007

(65) Prior Publication Data

US 2009/0070369 A1 Mar. 12, 2009

(51) Int. Cl.
*G06F 17/30* (2006.01)
(52) U.S. Cl. .......................... 707/706; 707/736; 707/805
(58) Field of Classification Search ................. 707/1–6, 707/10, 100, 102, 104.1
See application file for complete search history.

(56) References Cited

U.S. PATENT DOCUMENTS

| | | | |
|---|---|---|---|
| 5,046,004 A | 9/1991 | Tsumura et al. | |
| 5,341,350 A | 8/1994 | Frank et al. | |
| 5,355,302 A | 10/1994 | Martin et al. | |
| 5,734,961 A | 3/1998 | Castille | |
| 5,781,889 A | 7/1998 | Martin et al. | |
| 5,915,238 A | 6/1999 | Tjaden | |
| 5,966,495 A | 10/1999 | Takahashi et al. | |
| 6,308,204 B1 | 10/2001 | Nathan et al. | |
| 6,336,219 B1 | 1/2002 | Nathan | |
| 6,346,951 B1 | 2/2002 | Mastronardi | |
| 6,381,575 B1 | 4/2002 | Martin et al. | |
| 6,397,189 B1 | 5/2002 | Martin et al. | |
| 6,421,651 B1 | 7/2002 | Tedesco et al. | |
| 6,430,537 B1 | 8/2002 | Tedesco et al. | |
| 6,578,051 B1 | 6/2003 | Mastronardi et al. | |
| 6,748,395 B1 * | 6/2004 | Picker et al. ................. | 707/102 |
| 7,576,278 B2 * | 8/2009 | Urata .......................... | 84/600 |
| 2001/0018858 A1 * | 9/2001 | Dwek .......................... | 84/609 |
| 2002/0059208 A1 * | 5/2002 | Abe et al. ...................... | 707/3 |
| 2002/0126141 A1 | 9/2002 | Mastronardi | |
| 2004/0128286 A1 * | 7/2004 | Yasushi et al. ................. | 707/3 |
| 2004/0131255 A1 | 7/2004 | Ben-Yaacov et al. | |
| 2004/0158875 A1 | 8/2004 | Van Der Meulen | |
| 2004/0255340 A1 | 12/2004 | Logan | |
| 2005/0060405 A1 | 3/2005 | Nathan et al. | |
| 2005/0074100 A1 | 4/2005 | Lederman | |
| 2005/0076376 A1 | 4/2005 | Lind | |
| 2005/0216348 A1 | 9/2005 | Martin et al. | |
| 2006/0018208 A1 | 1/2006 | Nathan et al. | |
| 2006/0041581 A1 | 2/2006 | Aghvami et al. | |

* cited by examiner

*Primary Examiner*—Cam-Linh Nguyen
(74) *Attorney, Agent, or Firm*—Dickstein Shapiro LLP (57) ABSTRACT

Systems and methods for searching entertainment content on a computer jukebox are provided in which, in exemplary embodiments, a user may select which music library to search if more than one music libraries are available for searching. Also provided is a system and method of searching entertainment content on a computer jukebox in which, in one embodiment, search results from a first music library are provided based on a input search criteria, and search results are provided from a second music library based on the same search criteria in response to only a single action performed by a user.

25 Claims, 7 Drawing Sheets

SYSTEMS AND METHODS FOR CONDUCTING SEARCHES OF MULTIPLE MUSIC LIBRARIES

BACKGROUND

Traditionally, jukeboxes were large machines containing a collection of vinyl records or compact discs (CD's) and a record player or CD player to play songs selected by users. Jukeboxes using CD's or vinyl records to store songs were limited in the number of songs that they could provide to users by the number of CD's or vinyl records that could physically fit inside the jukebox. Consequently, the number of songs that could be stored in the jukebox was relatively small and was limited to the newest and most popular music available. Accordingly, the music selection menu, which contains the list of music that may be selected for play by a user, was also relatively small and could be easily navigated by a user to quickly find the newest and most popular music.

The development of computer jukeboxes greatly increased the number of songs that could be stored in a jukebox. A computer jukebox stores entertainment content, such as songs, videos, and other forms of entertainment in digital format on a digital memory. The digital memory can be much smaller, physically, than a collection of CD's or records and can contain thousands of songs. Computer jukeboxes may therefore be located in a wide variety of public and private locations. Furthermore, computer jukeboxes are not limited to playing music, but may play songs, videos, and other forms of entertainment ("entertainment content"). As used herein, the term "song," "music," "album," or "video" also refers generally to entertainment content. Essentially, any computer system capable of playing entertainment content on demand or in any automated fashion is a computer jukebox.

The dramatic increase in the number of songs that may be stored in the digital memory of a computer jukebox allows for a wide variety of music to be stored. In addition to the newest and most popular songs, computer jukeboxes may also store less popular songs, older songs, and even obscure songs that may rarely be selected for play. Additionally, computer jukeboxes may be connected to a network so that music stored at a data center may also be available to be selected for play by a user. A data center may be located remotely from the computer jukebox and may provide music to a network of computer jukeboxes. A data center may use more sophisticated computers (i.e., computers with more memory, greater storage capacity, higher capacity processing chip). Therefore, because they are less constrained by cost and physical space than an individual computer jukebox, a data center may contain hundreds of thousands of songs that may be available for selection by a user of an individual computer jukebox.

While it is generally considered desirable to have a large number of songs available for selection by a user, many of the songs available for selection will be of little or no interest to a particular user or less popular, and therefore, may be less desirable songs. The large number of less desirable songs may cause the music selection menu to become cluttered and may prevent a user from quickly and easily finding the most desirable, newest, or most popular music to select for play.

What is needed is a way for a user to more easily search a music database using a computer jukebox.

BRIEF SUMMARY

In various exemplary embodiments, the present invention provides a system and method for searching music libraries contained on and connected to a computer jukebox. The present invention provides exemplary systems and methods of searching entertainment content on a computer jukebox in which search results from a first music library are provided based on an input search criteria, and search results are provided from a second music library based on the same search criteria in response to only a single action performed by a user.

One embodiment provides a method of searching a computer jukebox for music, comprising: assigning each of a plurality of songs to at least one music library; determining if more than one music library is available for searching in response to a request for a search; automatically selecting the music library to be searched if only one music library is available for searching; and providing a list of music libraries available for searching if more than one music library is available for searching.

In another embodiment, the invention provides a method of searching a computer jukebox for music, comprising: determining whether the computer jukebox is connected to a data center in response to a request for a search; automatically selecting a first music library, consisting of songs stored on a digital memory of the computer jukebox, to be searched if the computer jukebox is not connected to the data center; and providing a list of music libraries available for searching if the computer jukebox is connected to the data center, wherein the list of music libraries comprises the first music library and a second music library comprising songs stored at the data center.

In another embodiment, the invention is directed to a computer jukebox system, comprising: a computer jukebox, comprising: a digital memory for storing a plurality of songs in digital files, an audio output unit for playing the plurality of songs, a processor for transferring the plurality of songs from the digital memory to the audio output unit, and a communication interface for receiving songs; and a data center storing a plurality of songs and comprising at least one server for transferring a songs to the communication interface of the computer jukebox, digital memory in response to a user selection, and a communication interface for receiving songs from the data center; wherein the processor determines if more than one music library is available for searching in response to a request for a search; wherein the processor automatically selects the music library to be searched if only one music library is available for searching; and wherein the processor provides a list of music libraries available for searching if more than one music library is available for searching.

BRIEF DESCRIPTION OF THE DRAWINGS

The foregoing and other aspects of the invention will be better understood from the following detailed description of the invention, which is provided in connection with the accompanying drawings, in which.

DETAILED DESCRIPTION OF THE PREFERRED EMBODIMENTS

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that changes to the described embodiments may be made without departing from the spirit and scope of the present invention.

Figure 1:
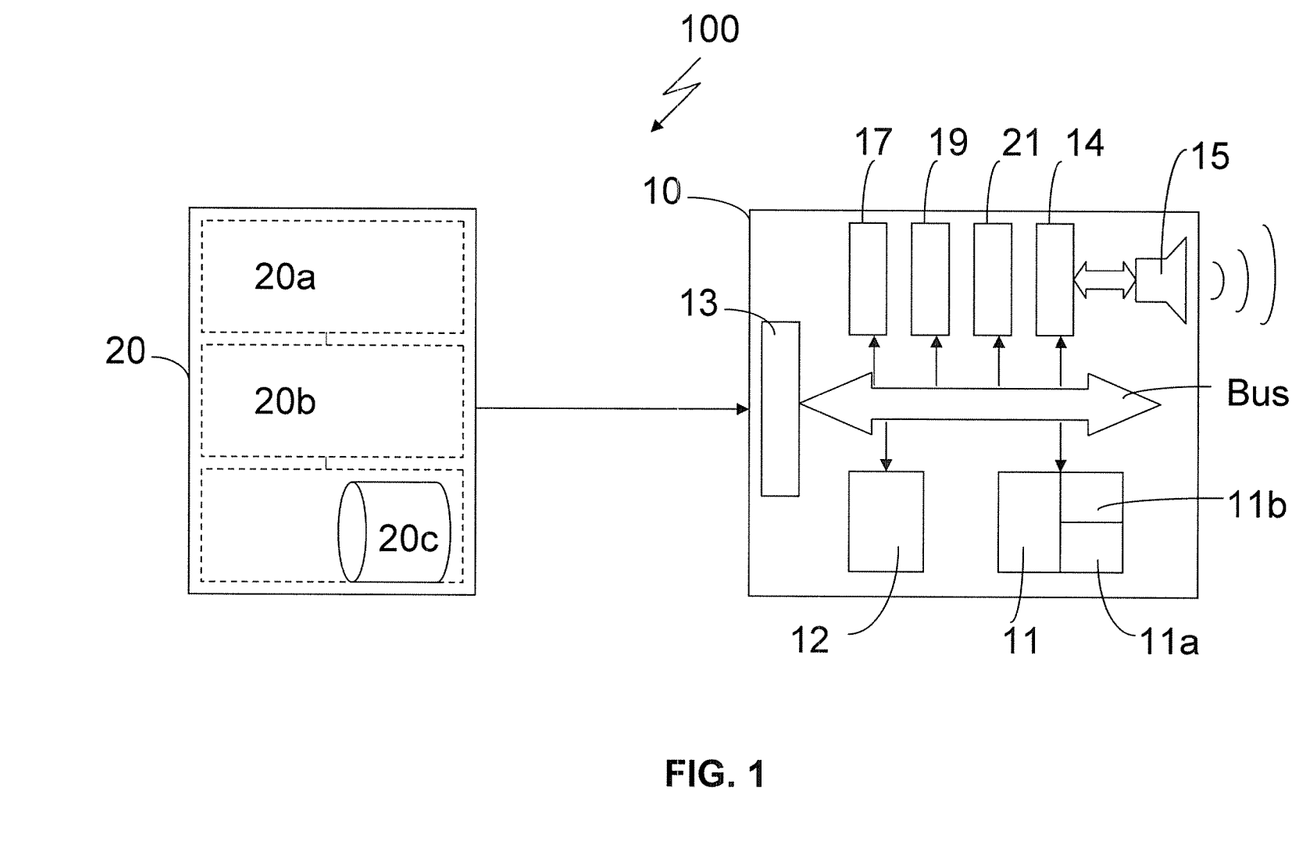
FIG. 1 is a diagram of a computer jukebox system in accordance with an embodiment of the invention.

FIG. 1 shows an exemplary portion of a jukebox system 100 according to the invention. The jukebox system 100 includes a computer jukebox 10, connected to a data center 20. The data center 20 may be a single computer server or multiple computer servers 20a, 20b, 20c, each of which may include all necessary computer components for receiving, sending, and processing information to the computer jukebox 10 and multiple other computer jukeboxes (not shown). When multiple servers 20a, 20b, 20c are used, each may provide particularized functions, such as communicating with the computer jukebox 10, storing digital music files that can be downloaded by the computer jukebox 10, and storing a database containing information necessary for managing the computer jukebox 10. The database may also contain information for calculating billing and/or royalty payments. The data center 20 may be one centrally located data center, a series of regional data centers, or a combination of centrally located and regional data centers.

The computer jukebox 10 includes at least one digital memory 11 for storing a plurality of digital music files and information relating to the stored musical files. The digital memory can include a hard drive, a collection of hard drives, or any other type of memory capable of storing digital music files (e.g., RAM, DVD-RAM, DVD-RW, CD-RW, memory stick, memory cards (CF, SD, XD), jump drive, mp3 player, flash memory, personal digital assistant, and cell phone). The digital memory 11 can optionally include a temporary cache 11a and a local file 11b. The temporary cache 11a and the local file 11b may be physically separated or merely designated as separate storage sites.

The computer jukebox 10 also has a display 21, which may display graphics, such as album covers, and also displays text such as selection instructions and song titles. The display 21 may be in the form of a touch-screen, such that a user can make his selections by pressing points on the display 21. Alternatively, a user or administrator may enter selections or otherwise interact with jukebox 10 using a user input device 19, which may include a keyboard, mouse, stylus, the display 21, or any other device capable of inputting information into the computer jukebox 10.

The computer jukebox 10 can also have a processor 12, a communication interface 13, and an audio output unit 14 coupled to at least one speaker 15 for replaying the songs. The audio output unit 14 may include an audio card, a digital-to-analog converter, and means for decompressing compressed, digital files. The processor 12 may perform a variety of functions, including transferring the songs from the digital memory 11 to the audio output unit 14. The processor 12 may also store information to the digital memory 11 to compile a database containing the times that each song is played on the computer jukebox 10. The computer jukebox 10 can further include a communication interface for receiving songs from the data center 20.

The computer jukebox 10 may optionally include a money detector 17, such as a coin, bill, and/or credit card acceptor. The money detector 17 can include a device for electronic detection of a source of credit or money, such as a credit card or a device with a barcode or RFID tag).

To aid a user in quickly finding a desired song, songs available for selection for play by a user may be classified into one or more exemplary music libraries. A music library comprises, for example, a group of songs or any entertainment content (e.g., video) that are classified together due to a common characteristic. A user may then be given the option to limit a search for music or entertainment content to a specific library or libraries.

Songs may be assigned to specific libraries according to metadata associated with the digital song files. In one embodiment, the metadata can be stored as part of the digital file storing the content. In another embodiment, the metadata can be stored separately from the digital file storing the content (e.g., in a separate file or in a database). If the metadata is stored separately from the digital file storing the content, the metadata may include information used to match the metadata to the corresponding file storing the entertainment content. Songs may also be assigned to specific libraries according to the place and/or equipment on which they are stored, i.e., digital memory 11, local file 11b, temporary cache 11a, data center 20, data center server 20a, 20b, or 20c.

Characteristics that may be used to designate songs as belonging to one or more music libraries may include, for example, a musical genre, such as classical music, gospel, jazz, Latin pop, blues, rock, country music, electronic music, holiday music, melodic music, reggae, punk rock, hip hop, rap, movies/Broadway, new age, R&B/soul, and others. Other examples of characteristics include, but are not limited to, explicit lyric content, including explicit album cover art, holiday content, content performed by a specific artist or group, belonging to the same album, released in the same year or before or after a certain date, acoustic instrument content, lyric content, and content having a particular length. If the computer jukebox 10 contains entertainment content such as movies, televisions shows, or video/computer games, the characteristics can include being assigned the same maturity rating (e.g. "R", "PG", "PG13", "T", "E", etc.) Additionally, an administrator can create a library and assign whichever songs are desired to that library, even if the songs share no obvious characteristic.

In one embodiment, one music library includes only songs that are stored on the digital memory 11 of the computer jukebox 10. One way that songs are stored to the digital memory 11 is during production of the computer jukebox 10 when songs are stored to the local file 11b of the digital memory 11. The songs stored to the local file 11b during production may be selected based on their popularity. In one embodiment, the songs are selected based on popularity data collected from all computer jukeboxes on a network. In another embodiment, the songs are selected based on popularity data collected through a rating system, such as Billboard top songs, radio airplay indexes, record store sales (e.g., Amazon, iTunes, etc.) or other ratings systems. Alternatively, the content placed in digital memory 11 can be determined after production of the computer jukebox by, for example, a jukebox operator or user. For example, an operator or user may be able to access the computer jukebox directly or remotely (e.g., through the internet) to alter the content on the machine. Such access may be limited by, for example, password protection.

In another embodiment, songs are stored to the digital memory 11 when a user selects a song for play from the data center 20. Music that is available for selection for play by a user that is stored at the data center 20 but not on the digital memory 11 of the computer jukebox 10 is referred to as Music On Demand ("MOD") music. When a user selects a MOD song for play, the digital song file may be downloaded from the data center 20 to the digital memory 11 and stored in a temporary cache 11a in the digital memory 11 so that it may be played. The song may be stored in the temporary cache 11a while the song is being played, but may be written over when a new MOD song is downloaded when a user selects the new MOD song for play. The computer jukebox 10 may store a plurality of songs in the temporary cache 11a and play these songs from the temporary cache 11a rather than downloading the MOD selection at subsequent times when a user selects that song. However, songs stored in the temporary cache 11a will eventually be recorded over and erased when a certain number of new MOD songs are selected for play.

Because they are selected for storage on the digital memory 11 due to their popularity (e.g., predetermined or statistical popularity based on song requests or other criteria), songs stored on the digital memory 11 can optionally be called "Hot Music." Therefore, the music library containing only songs stored on the digital memory 11, i.e. Hot Music, is known as the "Hot Music library." In one embodiment, songs stored in both the temporary cache 11a and the local file 11b are included in the Hot Music Library. In another embodiment, only songs stored in the local file 11b are included in the Hot Music Library.

According to the embodiment, another music library includes only MOD songs that have been newly added to the data center 20. Songs and albums of songs may be added to the data center 20 on a regular basis. The newly added songs may be designated as "New Music" and may be included in a "New Music library" for a predetermined time period after they are added to the data center 20. The predetermined time period may be any length of time selected by a network administrator during which the added songs are considered "new." For example, in one embodiment, only songs added within the last 30 days will be included in the New Music library. The length of time that has passed since a song was added to the data center 20 may be tracked by recording the date that the song was stored on the server in meta data associated with the song. In one embodiment, when the predetermined time for a song to be considered new has elapsed, the song is no longer designated as New Music and is removed from the New Music library.

In another embodiment, a music library includes all songs that are available for selection for play by a user, including songs stored at the data center 20 and on the digital memory 11. This music library is known as the "All Music library." In one embodiment, the All Music library includes all songs stored on the digital memory 11 and all songs stored on the data center 20.

Figure 2:
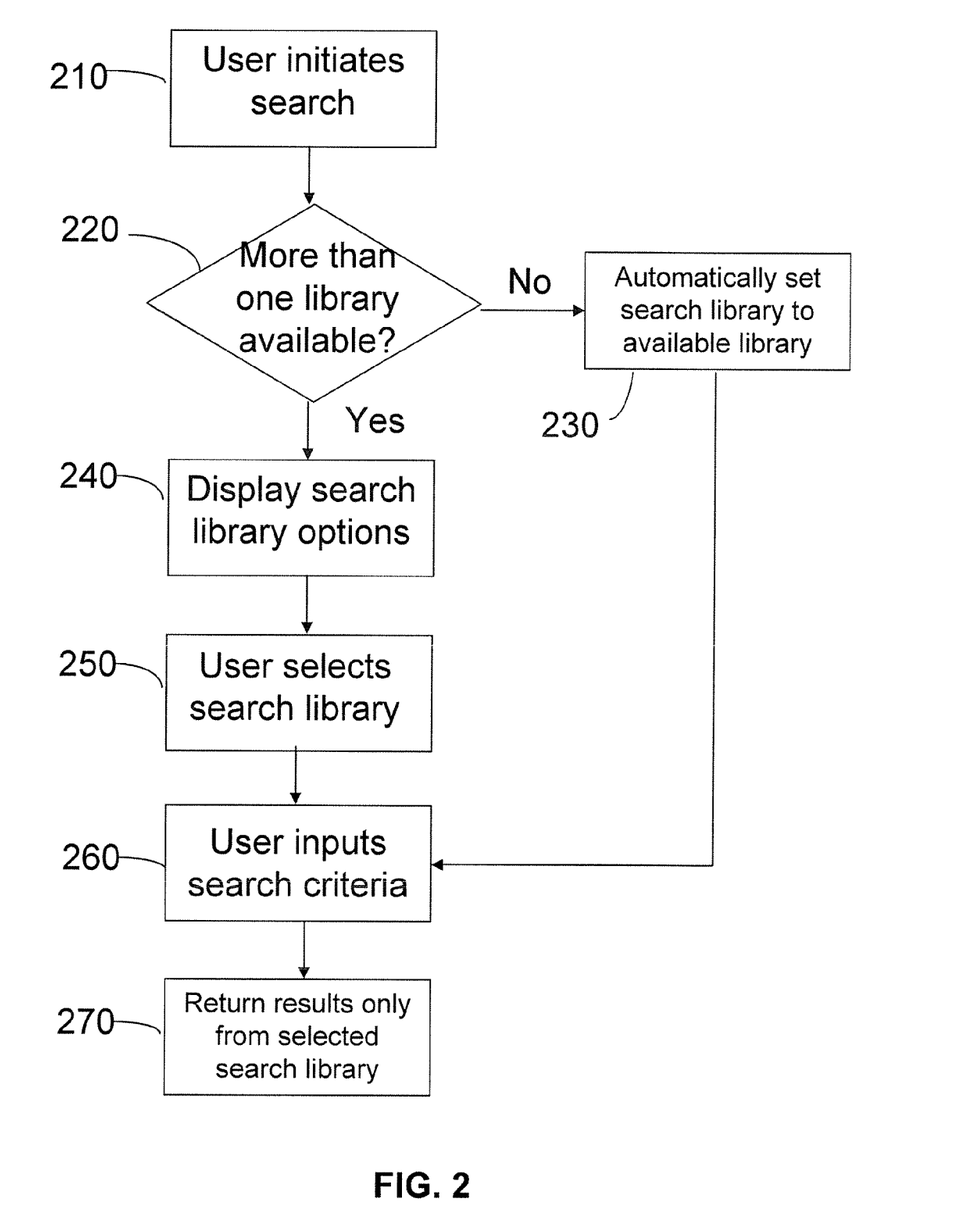
FIG. 2 is a flowchart of a method of searching entertainment content on a computer jukebox system in accordance with an embodiment of the invention.

FIG. 2 is a flowchart depicting a method of searching entertainment content on a computer jukebox system in accordance with an embodiment of the invention.

At step 210, a user initiates a search for a desired song. A user may initiate a search for a song using the user input device 19 by pressing a "Search" button or by making some other indication that the user wishes to initiate a search. In one embodiment, the display 21 is a touch screen with which a user may initiate a search by pressing indicated areas on the display 21.

After a user has initiated a search, the processor 12 of the computer jukebox 10 determines, at step 220, whether there is more than one music library available to be searched by a user. In one embodiment, if the music libraries include the Hot Music library, the New Music library, and the All music library, the availability of more than one library for searching depends on whether MOD songs are available to be selected for play. In one embodiment, to determine whether MOD songs are available for play, the processor 12 of the computer jukebox 10 determines whether the computer jukebox 10 is connected to the data center 20. If MOD songs are not available for play, then the New Music library and the All music library will not be available for searching since they both include MOD songs. MOD songs may be unavailable for play, for example, if the computer jukebox 10 does not have a current working connection to the data center 20, or if the connection to the data center 20 is too slow to download MOD songs on demand.

If the processor 12 determines that more than one music library is available to be searched by a user, the process proceeds to step 240 and the processor 12 will display the libraries that are available to be searched. In one embodiment, if MOD songs are available for play, all three of the available search libraries are displayed, including the Hot Music library, the New Music library, and the All Music library.

Figure 3:
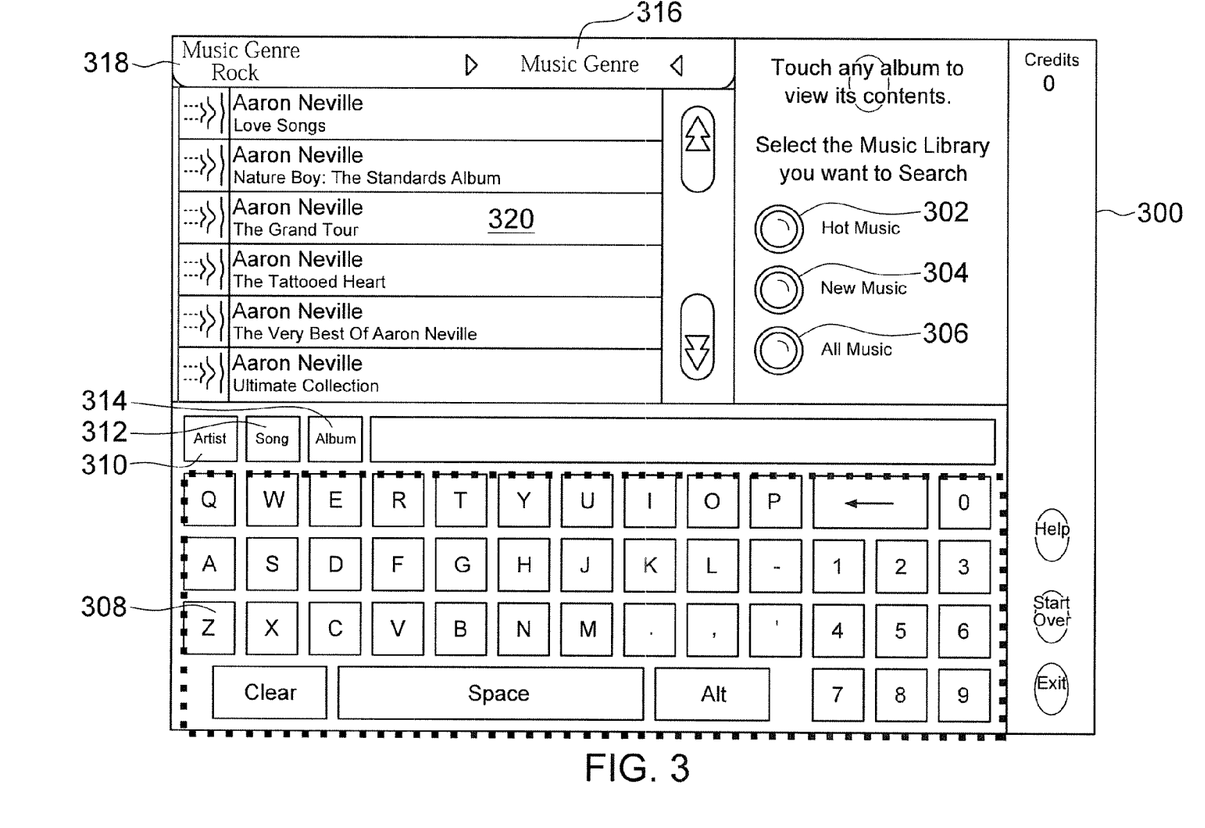
FIG. 3 is a touch screen showing a search feature in accordance with an embodiment of the invention.

At step 250, the user may select a library to search by pressing a button or making some other indication as to which library the user wishes to search. In one embodiment, one of the available libraries may be set as a default unless the user actively selects a different library. FIG. 3 shows a touch screen 300 according to an embodiment of the invention in which the user may select which of three libraries he wishes to search by pressing either the "Hot Music" button 302, the "New Music" button 304, or the "All Music" button 306. In one embodiment, the Hot Music library is selected by default and will be the library searched unless the user selects one of the other two music libraries.

Figure 4:
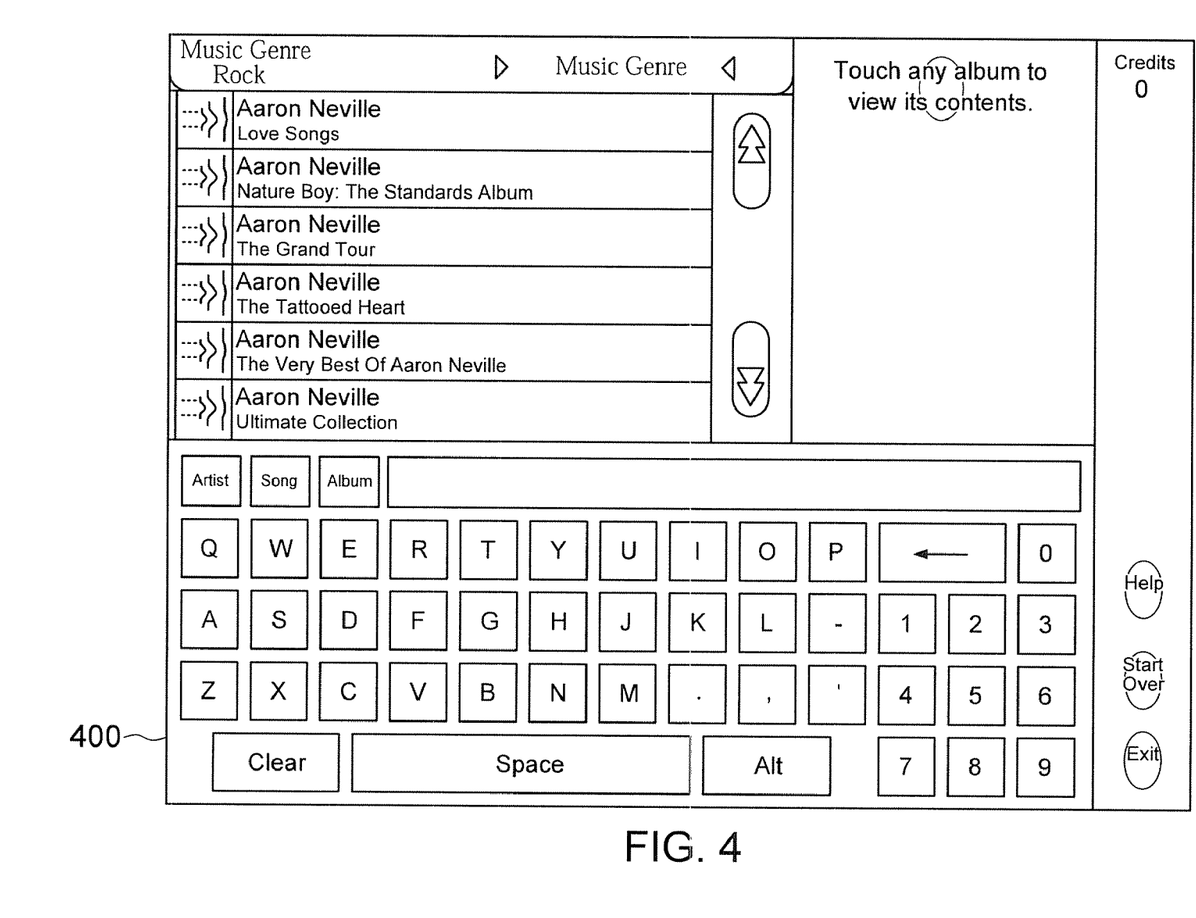
FIG. 4 is a touch screen showing a search feature in accordance with an embodiment of the invention.

If the processor 12 at step 220 determines that only one library is available for search, the method proceeds from step 220 to step 230. At step 230, the processor 12 automatically selects the only available library and the user is not presented with a choice as to which library to search. The user may or may not be informed of the fact that other libraries are not available. In the embodiment described above, if MOD songs are not available for play, for example, if the computer jukebox 10 is not connected to the data center 20, the Hot Music library is automatically selected as the library to be searched and the user is not presented with a choice. FIG. 4 shows a touch screen 400 according to an embodiment of the invention on which a search feature is displayed, but which does not include an option with which to select a search library to search. The Hot Music library has been automatically selected, but the user is not informed of the selection, nor is the user informed that the New Music library and the All Music library are not available for searching.

At step 260, the user may input search criteria to search for a song that the user wishes to select. In one embodiment, the user may conduct the search using the keypad 308 on the touch pad 300 shown in FIG. 3. In one embodiment, a user may type a single character or a series of characters, and the processor 12 will display search results beginning with the characters typed or containing the characters typed.

In one embodiment, a user may further define the search criteria to search within a music library for only songs that share a common characteristic. A non-exclusive list of possible common characteristics is described above with regard to the characteristics that may be used to create a music library. For example, in the embodiment shown in FIG. 3, a user may further define the search criteria to search for individual song titles by pressing the "song" button 312, or to search for groups of songs by pressing the "artist" button 310, which will return groups of songs performed by artists that meet the search criteria, or by pressing the "album" button 314, which will return groups of songs included in albums that meet the search criteria. The user may then view individual songs contained in a group by selecting the desired group. Also in the embodiment shown in FIG. 3, the user may further define the search criteria by selecting the genre of music as a common characteristic to be returned in the search results by pressing the area of the screen labeled "Music Genre" 316. For example, on the touch screen 300 it can be seen that the current genre of music to be returned in the search results "Rock" 318. Therefore, only songs classified as "Rock" will be returned in the search results from the selected music library. In another embodiment, a user may specify that all genres of music may be included in the search results.

At step 270, the processor 12 conducts a search based on the user's search and returns search results which include only songs included in the previously selected music library. In one embodiment, the processor 12 may conduct a separate search based on each character input by the user during step 260. By selecting a music library in which to conduct a search, a user may achieve search results more closely tailored to the user's desired results and, in one embodiment, may return results that include only popular music if the Hot Music library is searched, newly added music if the New Music library is searched, or all available music if the All Music library is searched.

In one embodiment, search results are provided that include only songs included in the previously selected music library in response to the search criteria input by a user, and a user may view search results from a different music library for the same input search criteria by taking only one additional action. For example, in one embodiment, a tab or a button may be available to a user, such that when the tab or button is pressed or otherwise activated by a user, search results for the same input search criteria will be displayed from a music library other than the music library that was originally searched. In one embodiment a user may toggle between the search results from different libraries by taking only one action to toggle from one set of search results to another.

Figure 5:
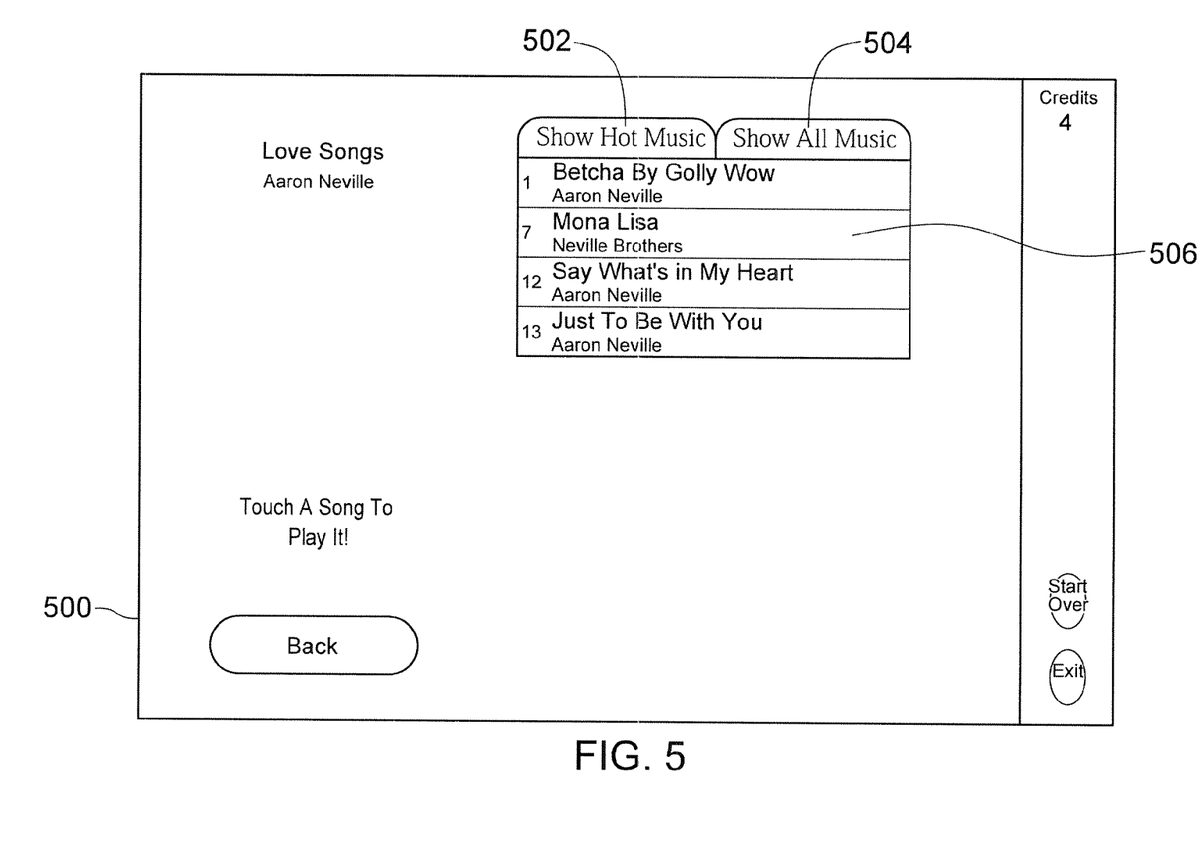
FIG. 5 is a touch screen showing a search feature in accordance with an embodiment of the invention.
Figure 6:
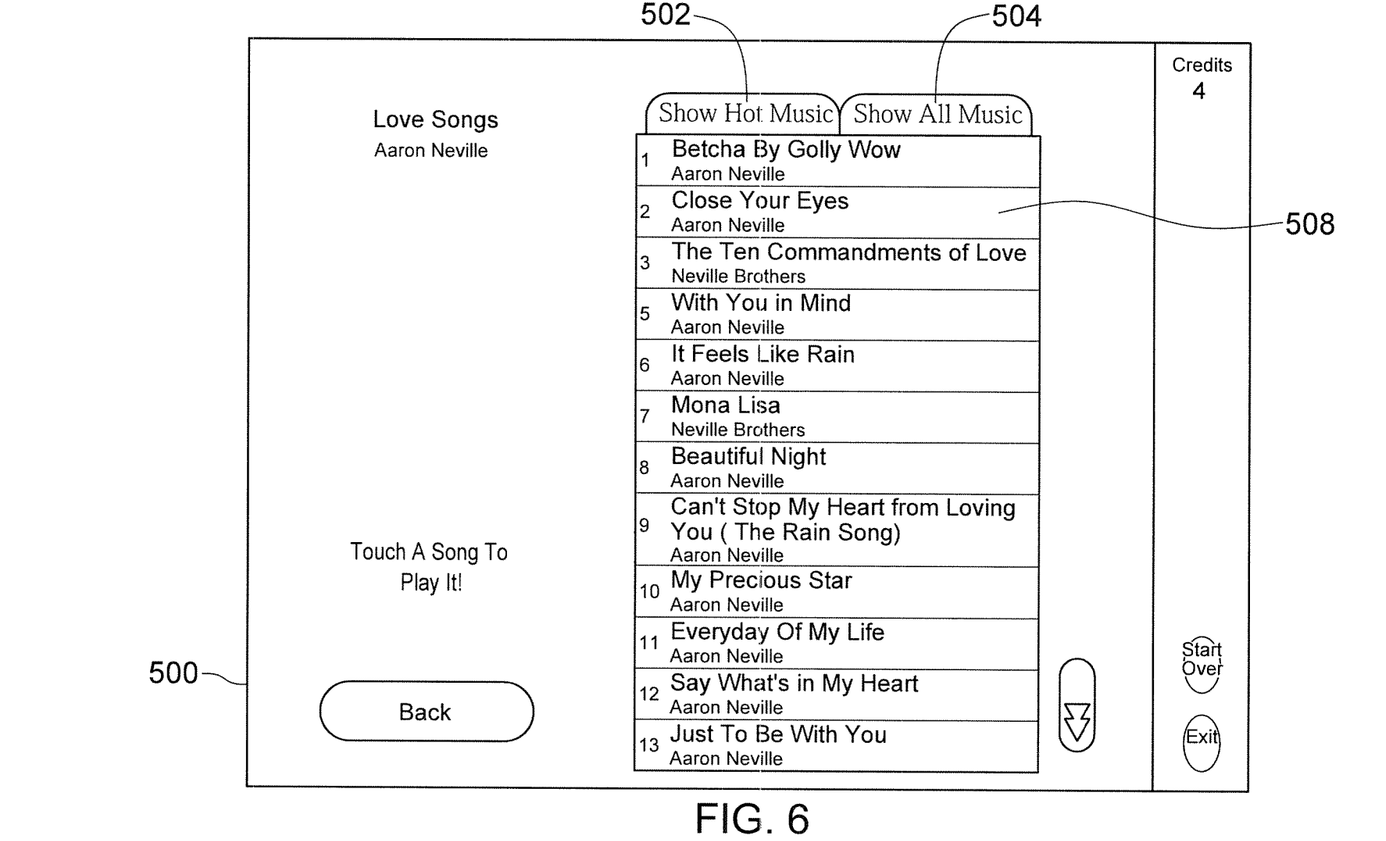
FIG. 6 is a touch screen showing a search feature in accordance with an embodiment of the invention.

FIG. 5 shows a touch screen 500 according to an embodiment of the invention which includes search results provided in response to an input search criteria where the music library searched was the Hot Music library. The touch screen 500 shows a list 506, having a tab 502 labeled "Show Hot Music" that lists all songs from the Hot Music library that met the input search criteria. The touch screen 500 also shows a tab 504, which is labeled "Show All Music." When a user presses the "Show All Music" tab 504, a list 508 of the songs that are included in the All Music library and that meet the input search criteria will be displayed as shown in FIG. 6. A user is thus able to toggle back and forth between search results provided from various music libraries by taking one action each time the user desires to view search results from a different music library.

Figure 7:
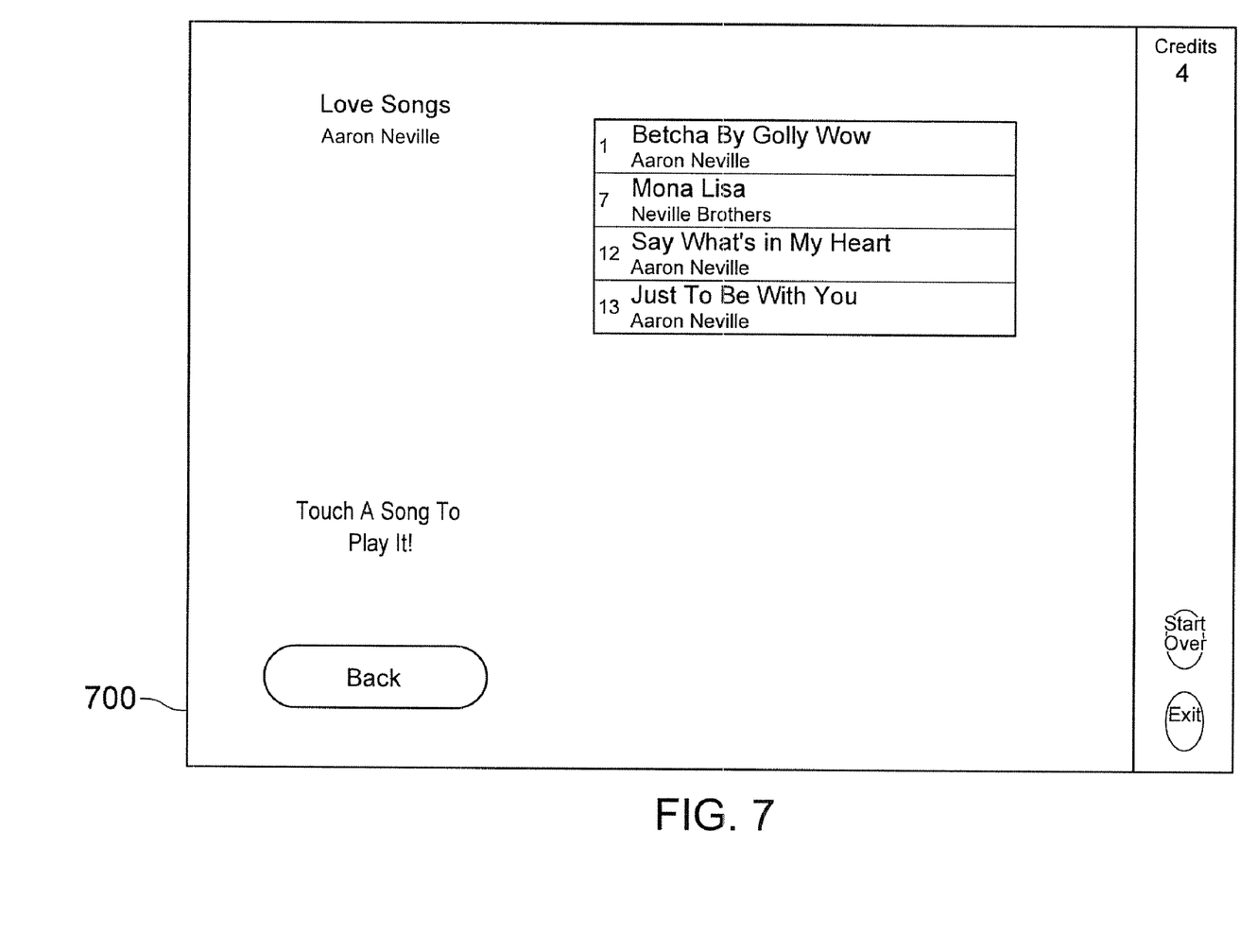
FIG. 7 is a touch screen showing a search feature in accordance with an embodiment of the invention.

In one embodiment, where only one library is available for search, step 230, the user will not be able to toggle between search results retrieved from various libraries. FIG. 7 shows a touch screen 700 that could be shown if the Hot Music library was automatically selected at step 230 because MOD songs were not available for play and where the album "Love Songs" by Aaron Neville was selected from the search results on the touch screen 400 shown in FIG. 4. In this example, only songs that are included in the Hot Music library are displayed and that the tabs 502 and 504 shown in FIG. 5 are not included.

It should be noted that the various embodiments of the invention described above can be used in combination with each other to facilitate a user search of the entertainment content available through the computer jukebox 10.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. For example, a jukebox as described above includes any type of machine that is capable of storing and playing music at a users selection, such as computer, an MP3 player, or a game machine. Further, it should be understood that although the embodiments of the invention may be described with reference to "music," "songs," and "albums," that this disclosure should not be limited to such and that the various embodiments of this invention may be applied to any type of entertainment content or grouping of entertainment content that may be stored in digital form and played on demand. Also, although embodiments have been described above as using a certain number of music libraries and/or music libraries containing songs sharing a specific characteristic, it should be noted that any number of music libraries could be provided and/or combined for use and that any number of characteristics could be substituted for the ones described in the embodiments above. Additionally, any modifications, though presently unforeseeable, of the present invention that come within the spirit and scope of the following claims should be considered part of the present invention.

What is claimed is:

1. A method of searching a computer jukebox for music, the computer jukebox comprising a digital memory and a processor, the method comprising:
    assigning each of a plurality of songs to at least a first music library and a second music library, wherein the first music library includes songs stored on a data center and wherein the second music library includes songs stored on a digital memory of the computer jukebox;
    using the processor to determine if more than one music library is available for searching;
    using the processor to automatically select a music library to be searched if only one music library is available for searching; and
    providing to a user a list of music libraries available for searching using one or more alpha/numeric characters if more than one music library is available for searching, the list of music libraries being provided in a format that allows the user to select which music library to search, wherein the list of music libraries available for searching includes the first music library if the first music library is available for searching and includes the second music library if the second music library is available for searching.

2. The method of claim 1, further comprising selecting a music library for searching from the list of music libraries available if more than one music library is available for searching.

3. The method of claim 2, further comprising entering a search criteria and returning search results from the selected music library that match the search criteria.

4. The method of claim 3, further comprising selecting at least one common characteristic and returning search results from the selected music library that match the search criteria and the at least one common characteristic.

5. The method of claim 4, wherein the at least one common characteristic comprises a song name, an artist name, an album name, or a music genre.

6. The method of claim 3, wherein entering a search criteria comprises entering characters and wherein search results are returned for each character that is entered.

7. The method of claim 2, further comprising entering a search criteria and returning search results from the selected music library and all other available music libraries that match the search criteria.

8. The method of claim 7, wherein the search results from the selected music library and all other available music libraries are displayed as separate lists.

9. The method of claim 1, wherein the first music library consists of songs that are stored at the data center.

10. The method of claim 9, wherein the first music library consists of songs that have been added to the data center within a predetermined time period.

11. The method of claim 1, wherein a second music library consists of songs that are stored on a digital memory of the computer jukebox.

12. The method of claim 1, further comprising assigning a plurality of songs to a third music library, wherein the third music library consists of songs that are stored at the data center and songs that are stored on the digital memory of the computer jukebox.

13. A method of searching a computer jukebox for music, comprising:
   determining whether the computer jukebox is connected to a data center in response to a request for a search;
   automatically selecting a first music library, consisting of songs stored on a digital memory of the computer jukebox, to be searched if the computer jukebox is not connected to the data center; and
   providing to a user a list of music libraries available for searching using one or more alpha/numeric characters if the computer jukebox is connected to the data center, the list of music libraries being provided in a format that allows the user to select which music library to search,
   wherein the list of music libraries comprises the first music library and/or a second music library, if the first and/or second music libraries are available, and wherein the second music library comprises songs stored at the data center.

14. The method of claim 13, wherein the second music library consists of all songs stored on the data center and all songs stored on the digital memory of the computer jukebox.

15. The method of claim 13, wherein the list of music libraries further comprises a third music library consisting of all songs stored at the data center that were added to the data center within a predetermined time period.

16. The method of claim 13, further comprising selecting a music library for searching from the list of music libraries available if the computer jukebox is connected to the data center, entering a search criteria, and returning search results from the selected music library that match the search criteria.

17. The method of claim 16, further comprising selecting at least one common characteristic and returning search results from the selected music library that match the search criteria and the at least one common characteristic, wherein the at least one common characteristic comprises a song name, an artist name, an album name, or a music genre.

18. A computer jukebox system, comprising:
   a computer jukebox, comprising:
      a display to be accessed by a user,
      a digital memory for storing a plurality of songs in digital files included in a second music library,
      an audio output unit for playing the plurality of songs,
      a processor for transferring the plurality of songs from the digital memory to the audio output unit, and
      a communication interface for receiving songs; and
   a data center for storing a plurality of songs included in a first music library and comprising at least one server for transferring songs to the communication interface of the computer jukebox,
   wherein the processor determines if more than one music library is available for searching in response to a request for a search, the processor automatically selecting the music library to be searched if only one music library is available for searching; and
   wherein the processor provides on the display a list of music libraries available for searching using one or more alpha/numeric characters if more than one music library is available for searching, the list of music libraries being provided in a format that allows a user to select which music library to search, and
   wherein the list of music libraries available for searching includes the first music library if the first music library is available for searching and includes the second music library if the second music library is available for searching.

19. The computer jukebox system of claim 18, wherein, in response to a selected music library and an input search criteria, the processor provides search results from the selected music library that match the search criteria.

20. The computer jukebox system of claim 19, wherein, in response to at least one selected common characteristic, the processor provides search results from the selected music library that match the search criteria and the at least one common characteristic.

21. The computer jukebox system of claim 19, wherein the processor provides search results for each character of the search criteria that is input.

22. The computer jukebox system of claim 18, wherein the data center stores the entirety of the first music library.

23. The computer jukebox system of claim 18, wherein the digital memory stores the entirety of the second music library.

24. The computer jukebox system of claim 18, wherein the digital memory stores a portion of a third music library and wherein the data center stores another portion of the third music library.

25. The computer jukebox system of claim 18, wherein, in response to a selected music library and an input search criteria, the processor provides search results from the selected music library and all other available music libraries that match the search criteria.

* * * * *